April 15, 1958 R. E. MOORE ET AL 2,830,336
SEAL
Filed May 13, 1954 2 Sheets-Sheet 1
Fig. 1
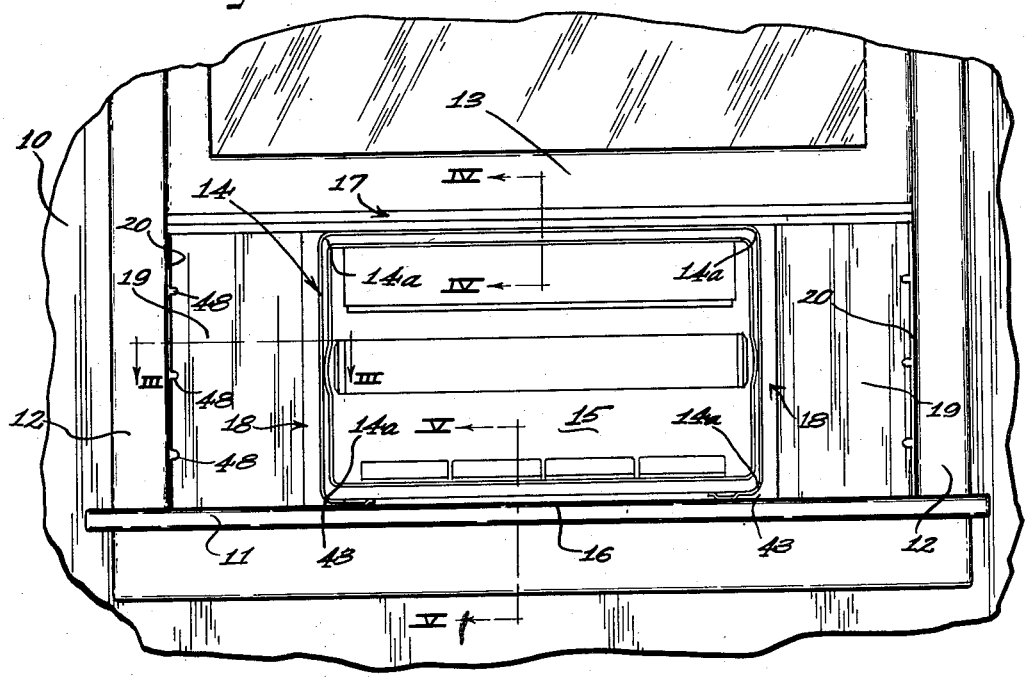
Fig. 2
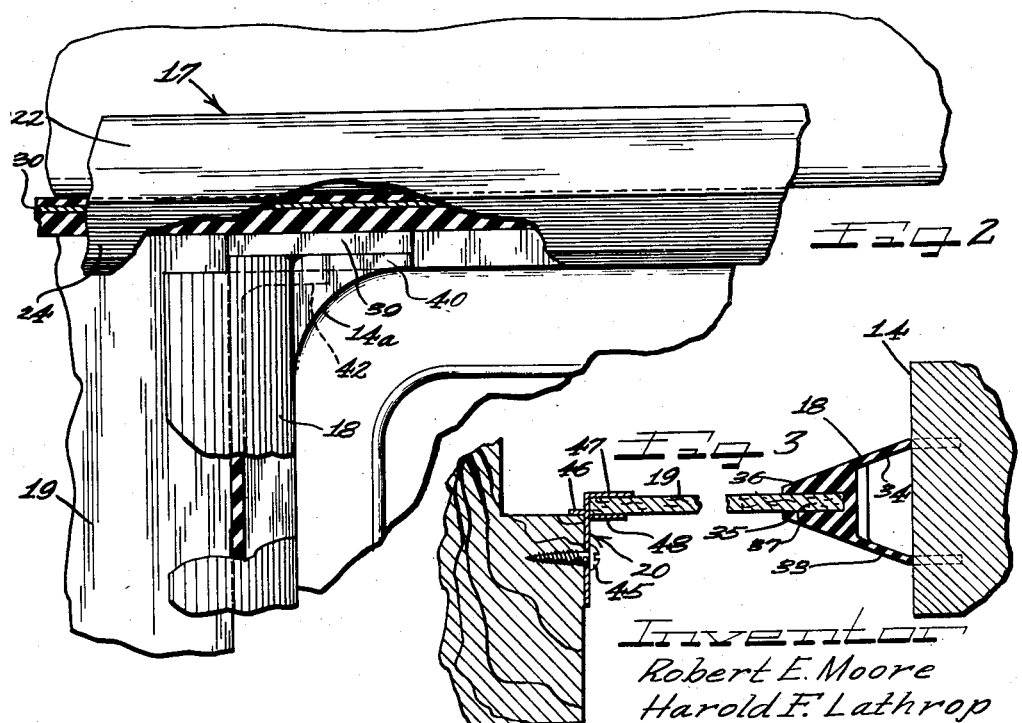
Fig. 3
Inventor
Robert E. Moore
Harold F. Lathrop
Wallace E. Kessell
Attys April 15, 1958  R. E. MOORE ET AL  2,830,336
SEAL
Filed May 13, 1954  2 Sheets-Sheet 2
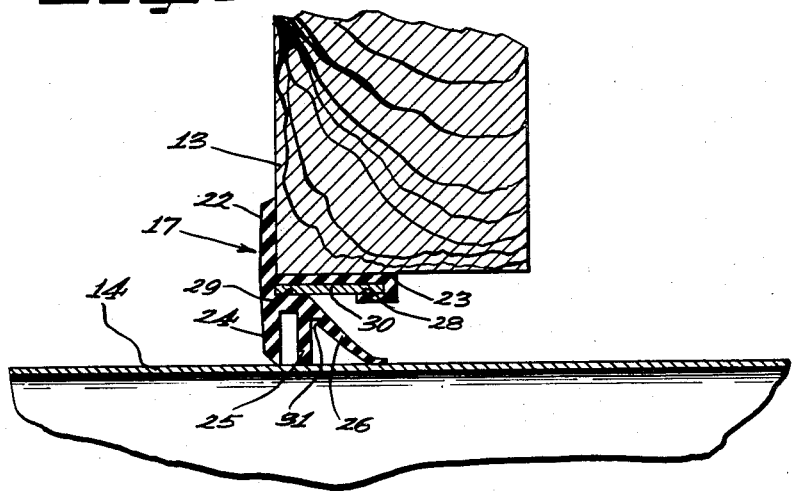
Fig. 4
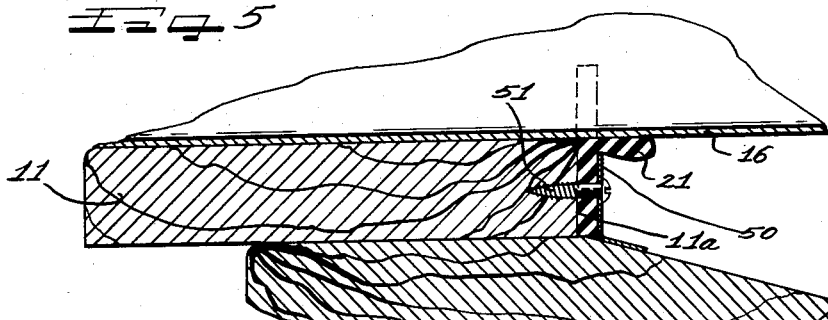
Fig. 5
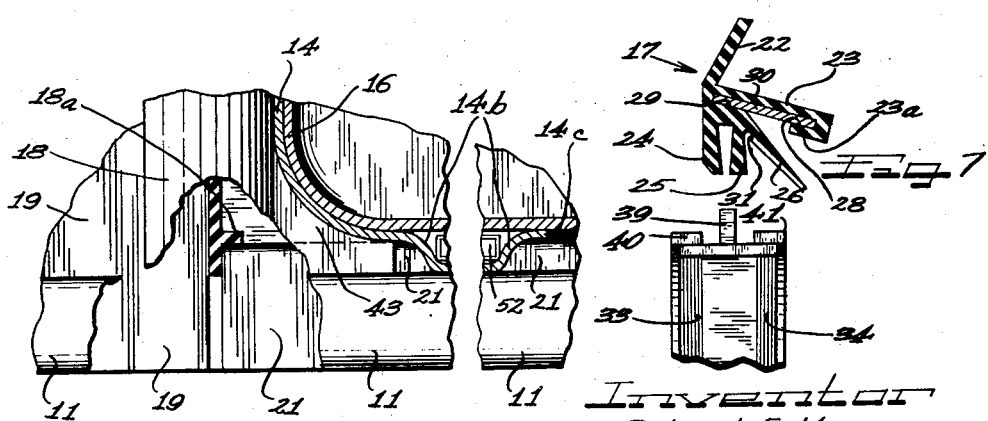
Fig. 6
Fig. 7
Inventor
Robert E. Moore
Harold F. Lathrop
Wallace E. Kessell

United States Patent Office 2,830,336
Patented Apr. 15, 1958

2,830,336

SEAL

Robert E. Moore and Harold F. Lathrop, Cedar Rapids, and Wallace E. Kessell, Iowa City, Iowa, assignors to Amana Refrigeration, Inc., Amana, Iowa, a corporation of Iowa Application May 13, 1954, Serial No. 429,492

8 Claims. (Cl. 20—69)

The present invention relates to a sealing structure and more particularly is concerned with the provision of a simple yet effective seal around an air-conditioning unit or the like positioned in a wall aperture.

Within the last few years the unit type of room air-conditioning unit has become extremely popular. Such units are constructed in compact sizes and are adapted for mounting in conventional window openings. Since window openings have notorious non-uniformity of dimension, the problem of providing a weather-tight seal between the outer housing of the air-conditioning unit and the casing of the window has posed a very serious installation problem.

In prior art attempts at the solution of the above mentioned sealing problem, very complex and highly expensive sealing gaskets have been utilized. Thus, in the prior art installations of which we are aware, the unit has been provided with a plurality of separate individual molded gaskets, along with calking material of various types, in order to provide a water and weather-proof seal at the window opening. Further, in order to provide an effective seal, the prior art arrangements have in many instances used a continuous gasket extending in the form of a solid loop completely around the air-conditioning unit. Such a continuous gasket, formed as a generally rectangular molded unit, has proved an extremely expensive item as well as being somewhat difficult to install.

In order to overcome the difficulties encountered with prior art sealing structures, applicants have constructed a simple yet highly effective seal combination in which an absolute minimum of molded gasket parts are necessary. Further, the components of applicants' sealing structure are capable of simple alteration to fit substantially any conventional window opening without the need for special tools.

In accomplishing the desired results, applicants have provided an assembly of interlocking, resilient, seal elements. These seal elements are maintained in position by their contact with each other and with the window opening. No adhesives or similar materials are required, and as a result, permanent defacement of the window casing is eliminated without sacrificing any sealing efficiency.

It is therefore an object of the present invention to provide a novel and a simplified combination of seal elements capable of sealing the opening between a mounted housing and the window frame.

A further object of the present invention is to provide an effective seal for window mounted air-conditioners or the like which has a minimum of molded components.

Yet a further object of the present invention is to provide a seal for a window mounted air-conditioner or the like wherein a single seal strip element operates to seal between the top wall of the air-conditioning unit and the bottom edge of the window sash and wherein the single element interlocks resiliently with upper ends of resilient seal members engaging the side wall of said air-conditioning or similar unit.

Still a further object of the present invention is to provide a novel and simplified means for positioning a sealing element securely yet demountably to the vertical edges of a window opening.

A feature of the present invention resides in a novel interlocking relationship between the horizontal seal extending between an air-conditioning or similar unit and the bottom edge of a window sash and a second vertical sealing element in sealing contact with a vertical wall of said air-conditioning unit.

A further feature of the present invention resides in a novel backing strip inserted in a longitudinal groove in a resilient sealing member whereby said sealing member is maintained in a rigid condition front to rear in a horizontal plane normal to the plane of the window and transmits the force from closing the window to the localized resilient portions of the member.

Yet a further object of the present invention is to provide sealing structure for weather-proofing the area between a wall aperture and an air-conditioning unit or the like positioned therein and which permits movement of the air-conditioning unit into selected adjusted positions relative to the plane of said wall, without changing the effectiveness of the seal.

Still a further object of the present invention is to provide a novel sealing element for resiliently cooperating with the base pan of an air-conditioning unit slidably mounted in a window opening which effects a weather-tight seal between the said base pan and the bottom edge of the window opening when said base pan is positioned therein.

Still other and further objects of the present invention will at once become apparent to those skilled in the art from a consideration of the attached drawings in which a preferred embodiment of the invention is illustrated and wherein:

Figure 1 is an elevational view illustrating the seal of the present invention in its assembled, operative, condition.

Figure 2 is an enlarged, partially elevational view of a portion of the seal of the present invention and illustrating the inter-relationship between the parts thereof.

Figure 3 is a cross-sectional view of the side portions of the seal of the present invention and taken along the line of III—III of Figure 1.

Figure 4 is an enlarged cross-sectional view illustrating the details of the top seal of the present invention and taken along the line IV—IV of Figure 1.

Figure 5 is an enlarged cross-sectional view illustrating the bottom seal constructed according to the present invention and taken along the line V—V of Figure 1.

Figure 6 is an enlarged end elevational view of the lower left hand corner of the air conditioning unit and seal assembly as viewed in Figure 1 and partially broken away to illustrate the assembly thereof.

Figure 7 is a cross-sectional view of the sash seal strip in its unstressed condition and its relation to the vertical seal strips.

As shown in the drawings:

As shown in Figure 1, a window aperture is provided in the wall 10 by a horizontal window sill 11, vertically extending window sills 12 and a vertically slidable, horizontally extending, window sash 13. Within the aperture so defined, an outer air-conditioning unit housing indicated at 14 is rigidly secured to the sill 11. The housing 14 is mounted to extend in a generally horizontal position and there is slidably mounted therein an air-conditioning unit 15 having a smooth lower surface formed by the base pan 16 more clearly shown in Figures 5 and 6.

The space between the outer housing 14 of the air-conditioner 15, the vertical window frames or sills 12, and the slidable sash 13 is sealed to the weather by means of a combined seal comprising a horizontally extending sash seal generally indicated at 17, vertically extending side seals generally indicated at 18, side boards 19 and vertically extending side board securing channels 20. The space between the base pan or plate 16 of the air-conditioner unit 15 and the lower sill 11 is sealed by means of the resilient foam rubber strip 21 shown in Figures 5 and 6.

The horizontally extending sash seal strip 17 may be seen in its unstressed form in Figure 7. As is there illustrated, the strip 17 comprises a resilient, generally vertical flange 22, a generally horizontal flange 23, downwardly extending vertical flanges 24 and 25, and a diagonally extending flexible sealing flange 26. The horizontal flange 23 is provided with an inturned lip 23a which cooperates with the bottom surface of the horizontal flange 23 to provide a pocket 28. An oppositely facing pocket 29 is provided between the flange 23 and the upper surface of the diagonally extending sealing flange 26. As may be seen in Figure 7, a longitudinally extending metallic strip 30 is inserted in the space beneath the horizontal flange 23 with its lateral edges seating in the pockets 28 and 29.

In operation, the sash seal strip 17 lies directly under the window sash 13 as illustrated in Figures 1 and 4. As there shown, the generally vertically upstanding flange 22 is forced into a substantially vertical position by the sash 13 and the horizontal surface 23 is thereby maintained snugly against the bottom of the sash 13 by the tendency of the flange 22 to assume its normal unstressed condition relative to the flange 23 as shown in Figure 7. General rigidity of the entire strip 17 is maintained by the stiffening strip 30 and as a result the seal 17 is maintained snugly against the bottom of the sash 13 throughout its entire length. By providing the strip 30, a very thin horizontal flange 23 may be utilized and hence it is unnecessary to add a large bulk of integral stiffening material immediately beneath the flange 23. This elimination of material has permitted the provision of an extremely flexible and highly efficient sealing flange 26 which extends downwardly into a snug fit with the outer housing 14 of the air conditioner unit. Due to the extreme flexibility of the sealing flange 26, a highly efficient seal is provided even though there may be irregularities in the surface of the housing 14 or it is moved back and forth considerably, which movement tends to destroy the usefulness of most relatively inflexible prior art seals.

In sealing the space between the top of the outer housing 14 and the sash 13, the sealing flange 26 is given additional flexure control by the small notch 31 at the base thereof. This notch permits the flange 26 to bend a slight amount at its base as well as at its outer extremity, thereby permitting the flange 26 to accept changes in contour of the housing 14 without warping the extremity of the flange 26 sufficiently to cause a permanent set in the resilient seal material. It has been found that the notch 31 also provides a more effective laying-down action of the flange 26 against the housing 14, thereby providing a superior sealing effect.

It will be noted from the drawings that the seal strip 17 cooperates with the outer housing 14 in such a manner as to provide three separate sealing lips 24, 25 and 26. However, at the side extremities of the housing 14, the seal 26 no longer contacts the housing 14 and the entire sealing effect is accomplished by means of the flanges 24 and 25 which coact with the side boards 19 as shown in Figure 2. Between the side boards 19 and and the side walls of the housing 14, vertically extending sealing strips 18 are provided. These strips, as shown in Figures 2 and 3, comprise molded parts constructed of a semi-resilient material such as vinyl plastic or the like. As may be seen from Figure 3, the strips 18 have a generally V-shaped cross section with thin sealing walls 33 and 34 for flexible contact with the walls of the housing 14. A sealing relationship is maintained with the boards 19 by means of the flanges 35 and 36 which provide a groove 37 in which boards 19 sit.

An interlocking sealing relationship is provided between the vertical strips 18 and the horizontal sealing strip 17 by means of the upstanding projections 39, 40 and 41 on each of strips 18 and the groove between flanges 24 and 25 on strip 17. As shown in Figures 2, and 7, the upstanding flange 37 lies in the groove formed by the flanges 24 and 25. Likewise, the upstanding flange 41 fits between the flange 25 and the flange 26 of the strip 17 to substantially seal off the end of the space between flanges 25 and 26, which is left open at its ends due to the fact that the flange 26 contacts the top surface of casing 14 only. In the present instance, the housing 14 is generally reatangular but is provided with slightly rounded corners 14a. The sealing of these corners is provided for by the contoured ears 42 molded integrally with the strips 18. The ears 42 extend generally parallel to the boards 19 and carry extensions of the flanges 39, 40 and 41 for cooperation with the sealing strip 17, as above described. The strips 18 also carry rounded ears 43 at the bottom ends thereof which similarly cooperate with the rounded corners 14a at the bottom of the housing 14. Since no interlocking action is necessary, however, with the bottom horizontal strip, the ears 39, 40 and 41 are omitted from the bottom end of the strips 18. It will of course be understood that the shape of the ears 42 and 43 may be varied in accordance with variations in construction of the corners of the outer housing 14 without departing from the scope of the present invention.

Novel, simplified guideboard retaining strips 20 are shown in Figures 1 and 3. These strips are secured to the side frames 12 by means of conventional screws 45 or similar fasteners and are maintained in aligned position relative to the frames 12 by means of the bent over ears 46 which are pierced and deflected from the main body of the strips 20. The laterally extending exterior flange 47 is deflected during initial fabrication of the structure, and a series of backing ears 48 are provided in pierced, but undeflected condition during the manufacturing process. Upon installation of the device in the window, the strip is positioned against the frames 12 with the ears 48 in an undeflected condition and the ears are bent into the position shown in Figure 3 after sideboards 19 have been inserted into place. The metal of the strips 20 is of sufficient flexibility to permit deformation of the ears 48 by any conventional means such as a screwdriver or similar instrument capable of operation as a wedging lever.

It will be seen from a consideration of Figure 3 that the metallic strip 20 provides an effective seal with the boards 19 since the bent over flange 47 is impervious to weather and the boards 19 are maintained firmly against the flange 47 by means of the deflected ears 48.

An effective seal between the bottom or base plate 16 of the air-conditioning unit 15 and the sill 11, is provided by a rubber strip 21. This strip is secured snugly against the rear edge 11a of the sill 11 by means of a metal backing strip 50 secured to the sill 11 by conventional screws 51. The strip 21 is constructed to be a length the same as or slightly greater than the width of the air-conditioning unit as may be seen in Figure 6. There, the strip 21 is shown to extend between the flanges 33 and 34 of the side strip 18 beneath the rigidifying and sealing ledge 18a. The sideboard 19 extends below the level of the sill 11 to provide a general extension of the strip 21 thereby providing a substantially unbroken seal throughout the length of the sill 11. It will be noted that the sealing strip 21 is very flexible and is, preferably, constructed of a sponge rubber material in order to conform closely with the inturned channel 14b of the housing 14, as well as the space between the edge 14c of the housing and the base pan 16. As is shown in Figure 6, the channel 14b is closed off by means of a block 52 through which screws are passed for fastening the channel 14b to the sill 11.

It will be understood from the above discussion and description that the several components of the air-conditioner seal of the present invention are extremely inexpensive. The strip 17 is a readily extrudable part while the strips 20 are simply rolled steel parts upon which a single piercing operation need be performed. Likewise, the metal retaining strip 50 is a simple rolled metal strip and the seal 21 is a plain strip of rubber of generally rectangular cross section. The only molded parts are the vertically extending seals 18, which comprise a far smaller sealing area than the area necessarily covered by expensive molded parts in the heretofore known prior art.

It will thus be apparent that we have provided a novel, highly efficient, and yet much simplified seal structure for use in sealing an air-conditioner, ventilator, or like receptacle in a window aperture. It is to be understood, of course, that various modifications and variations may be made in the structure above described without departing from the scope of the novel concepts of the present invention. We do not, therefore, intend to be limited other than necessitated by the scope of the appended claims.

We claim as our invention:

1. In combination with a window opening or the like and a generally rectangular housing positioned therein, a first resilient seal strip positioned horizontally between the top of said opening and said housing, second and third resilient seal strips extending vertically in contact with the side wall of said housing, first and second sections of self-supporting sheet material positioned between said second and third seal strips and the side walls of said opening, said first seal strip having a longitudinally extending groove in the bottom edge thereof, and each of said second and third strips having longitudinally extending grooves in the edges thereof removed from said housing, said second and third strips having projections on their upper ends for resilient sealing cooperation with the groove in said first strip, said sections extending into the grooves of said first, second and third strips, and means securing said sections to the side walls and bottom of said opening.

2. An extruded resilient weather-seal comprising a continuous length of material having a constant cross-section and having a first upwardly extending flange lying at an acute angle to the vertical, a second generally horizontal flange, a downwardly opening, longitudinally extending groove, a third flexible sealing flange extending downwardly and angularly away from said groove, and a longitudinally extending pocket in the underside of said horizontal flange for the reception of a longitudinally extending stiff backing member, whereby said horizontally extending flange is maintained in a substantially rigid condition without affecting the resiliency of said sealing flange.

3. An interlocking seal for sealing the corner of a housing member to an aperture, comprising, a sealing strip extending along one wall of said housing and a second sealing strip extending along an adjacent but angularly positioned wall of said housing, said first strip having a longitudinally extending groove in the surface thereof contacting said housing, said second strip having a longitudinally extending projection on the end thereof for insertion in said groove, said first strip having an angularly disposed sealing flange adjacent said groove and in contact with said housing, and said second strip having a second longitudinally extending projection spaced laterally from said first projection for contact with said sealing flange whereby a seal is provided at the corner joint between said first and second strips and said housing.

4. A sealing means comprising in combination a seal and a housing for closing the space between said housing and a window opening in which said housing is positioned, a first seal strip positioned horizontally between the top of said window opening and said housing, second and third seal strips extending vertically in contact with the side wall of said housing and extending into recesses in said first seal strip, first and second sections of self-supporting sheet material positioned between said second and third seal strips and the side walls of said opening, said first seal strip having a downwardly facing groove extending along at least a portion thereof, a groove in each of said second and third strips on the edges thereof remote from said housing, said grooves cooperating with said first and second sections to provide a weather-seal, means for sealing the edges of said sections not in said grooves to the edges of said window opening, and a fourth seal strip secured to the bottom edge of said window and extending into resilient contact with the bottom surface of said housing and with said second and third strips.

5. A sealing means comprising in combination a seal and a housing for closing the space between said housing and a window opening in which said housing is positioned, a first seal strip positioned horizontally between the top of said window opening and said housing, second and third seal strips extending vertically in contact with the side wall of said housing and extending into recesses in said first seal strip, first and second sections of self-supporting sheet material positioned between said second and third seal strips and the side walls of said opening, said first seal strip having a groove extending along at least a portion thereof, a groove in each of said second and third strips on the edges thereof remote from said housing, said grooves cooperating with said first and second sections to provide a weather-seal, means for sealing the edges of said sections not in said grooves to the edges of said window opening, said second and third strips having recesses at the bottom ends thereof, and a fourth seal strip secured to the bottom edge of said window and extending into resilient contact with the bottom surface of said housing, said fourth seal strip extending at least the width of said housing to a position adjacent the said self-supporting sections on the rear of the bottom edge of said window opening and extending into said recesses in said second and third strips for sealing engagement therewith.

6. A seal for closing the space between a generally rectangular housing and a window opening in which the housing is positioned, a first seal strip positioned horizontally between the top of said window opening and said housing, second and third seal strips extending vertically in contact with the side wall of said housing and extending into recesses in said first seal strip, said second and third strips each having a plurality of thin, flexible longitudinally extending seal edges in contact with the side walls of said housing and integral substantially flat inturned end portions in contact with the corners of said housing.

7. A sealing means comprising in combination a seal and a housing for closing the space between said housing and a window opening in which said housing is positioned, a first seal strip positioned horizontally between the top of said window opening and said housing, second and third seal strips extending vertically in contact with the side wall of said housing and extending into recesses in said first seal strip, first and second sections of self-supporting sheet material positioned between said second and third seal strips and the side walls of said opening, said first seal strip having a downwardly facing groove extending along at least a portion thereof, a groove in each of said second and third strips on the edges thereof remote from said housing, said grooves cooperating with said first and second sections to provide a weatherseal, means for sealing the edges of said sections not in said grooves to the edges of said window opening, a fourth seal strip secured to the bottom edge of said window and extending into resilient contact with the bottom surface of said housing and with said second and third strips, said last named means including a channel extending vertically along each side of said opening, each channel having a first attachment flange extending adjacent and parallel to the side of said opening, a second sealing flange perpendicular to said first flange and extending inwardly therefrom toward said housing into juxtaposition with its respective section of sheet material, deflectable retaining means on said channel for securing said section thereto, and integral guide abutments on said first flange for positioning said channel parallel to its respective side wall of said opening.

8. A resilient weather seal comprising a length of resilient material having a cross sectional configuration comprising a body portion, a longitudinal slot in said body portion for association with the edge of a first member to be sealed, a pair of thin resilient longitudinally extending flanges projecting from said body on the side thereof opposite from said slot and projecting from said body laterally at an angle to the plane of said slot for angle abutment with a second member to be sealed, said seal having an inturned end portion and a rib extending outwardly from said end portion substantially in the plane of and perpendicular to said slot.

References Cited in the file of this patent

UNITED STATES PATENTS

| | | |
|---|---|---|
| 1,259,117 | McCormick | Mar. 12, 1918 |
| 1,612,257 | Bowen | Dec. 28, 1926 |
| 1,763,603 | Donahue | June 10, 1930 |
| 1,809,589 | Grimm | June 9, 1931 |
| 2,074,295 | Woodruff | Mar. 16, 1937 |
| 2,151,231 | Randall | Mar. 21, 1939 |
| 2,234,771 | Moore | Mar. 11, 1941 |
| 2,294,664 | Hubbard | Sept. 1, 1942 |
| 2,433,104 | Eberhart | Dec. 23, 1947 |
| 2,486,828 | Dybvig | Nov. 1, 1949 |
| 2,513,789 | Dudley | July 4, 1950 |
| 2,657,438 | Sparagen | Nov. 3, 1953 |
| 2,708,016 | Penton | May 10, 1955 |
| 2,717,513 | Smart | Sept. 13, 1955 |
| 2,764,786 | Flemming | Oct. 2, 1956 |